L. B. G. CARRERAS.
COFFEE PEELING AND CLASSIFYING MACHINE.
APPLICATION FILED APR. 14, 1916.
1,219,079.
Patented Mar. 13, 1917.
4 SHEETS—SHEET 1.
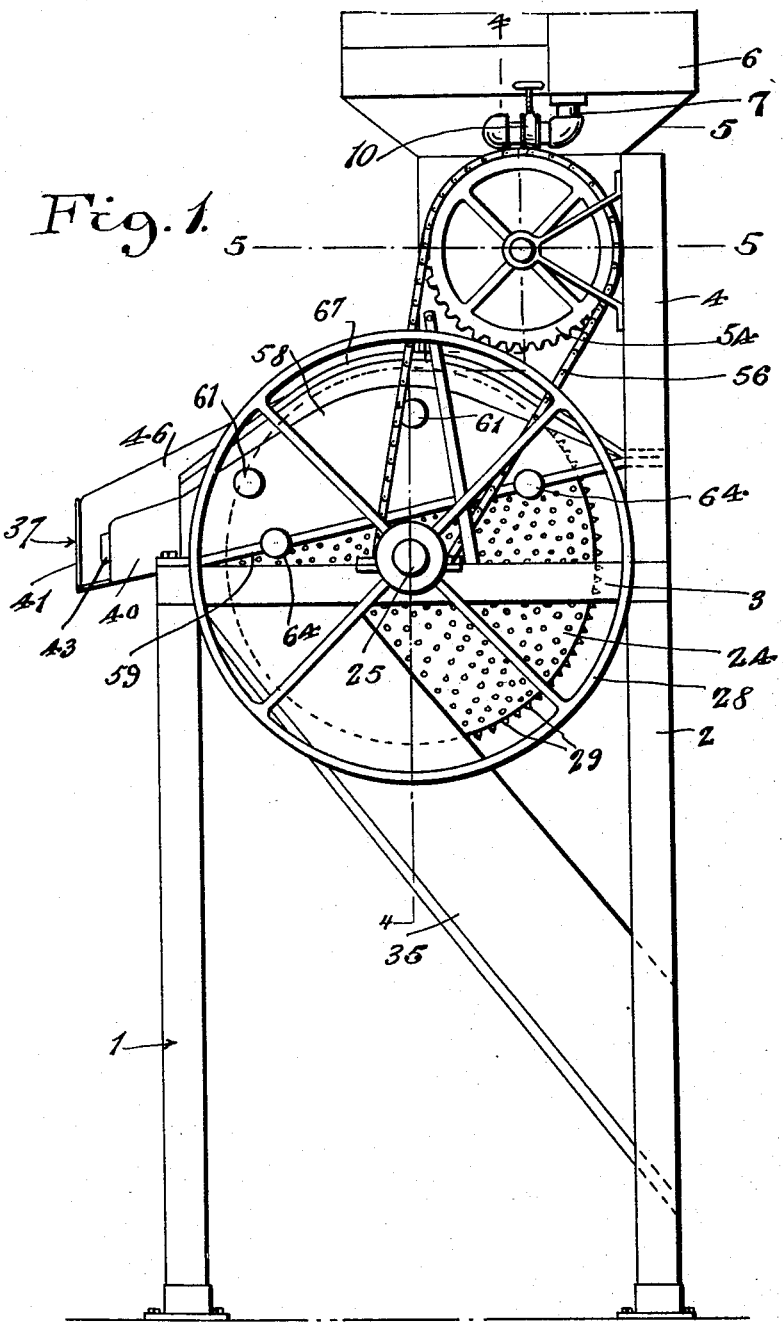

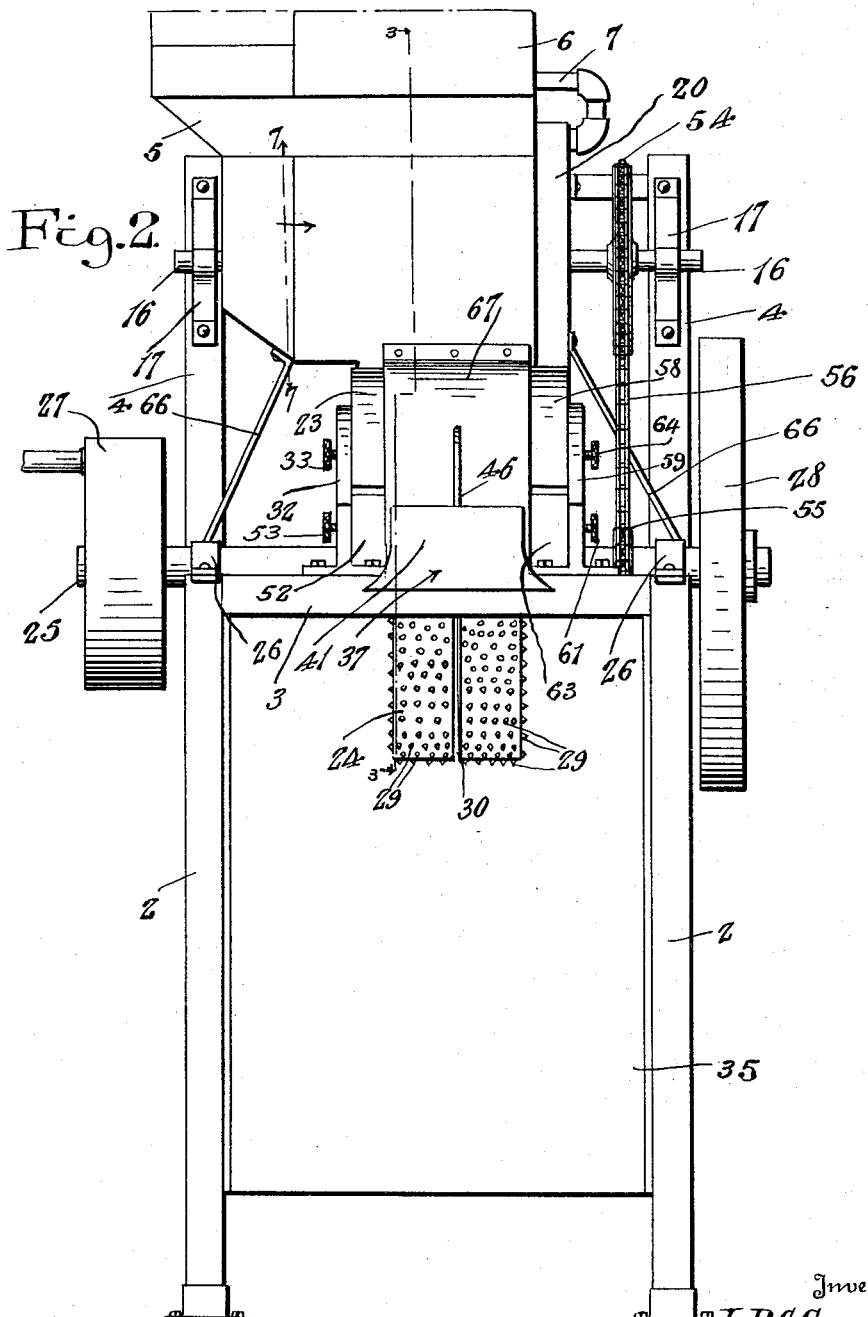

L. B. G. CARRERAS.
COFFEE PEELING AND CLASSIFYING MACHINE.
APPLICATION FILED APR. 14, 1916.
1,219,079.
Patented Mar. 13, 1917.
4 SHEETS—SHEET 3.
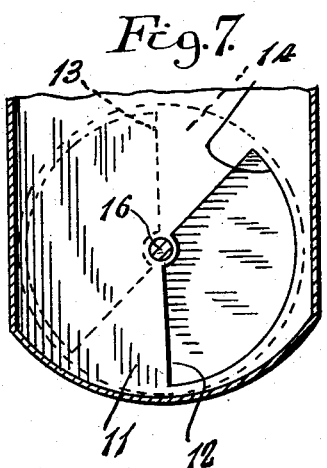
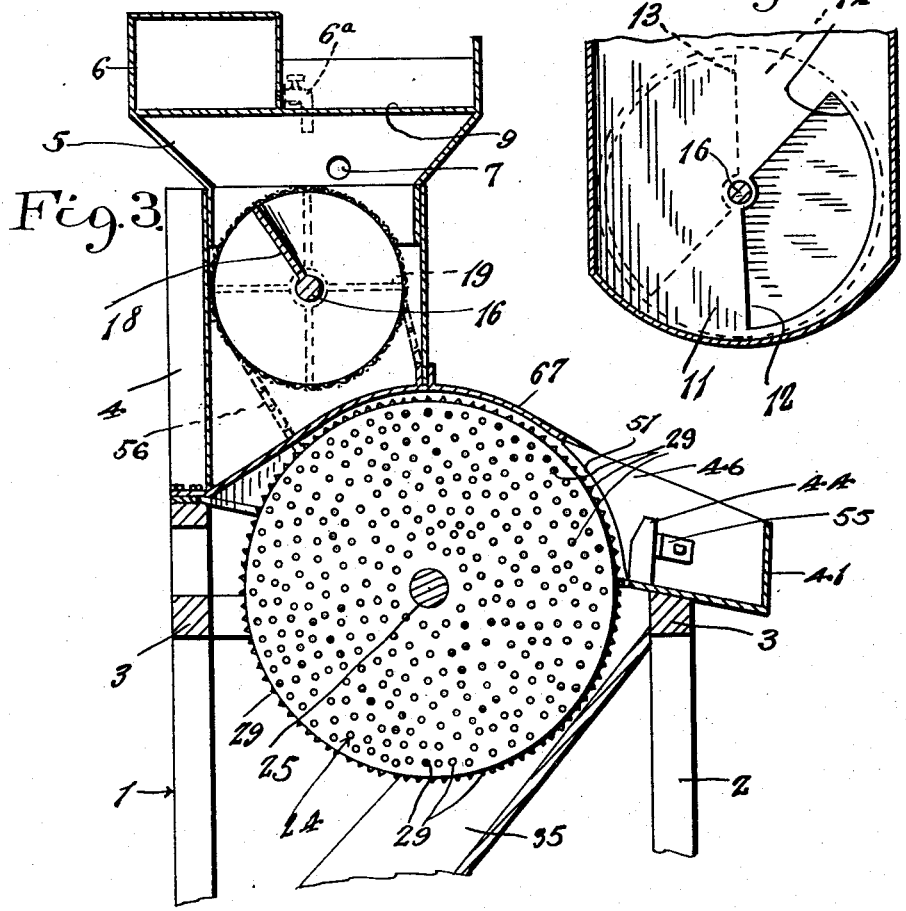
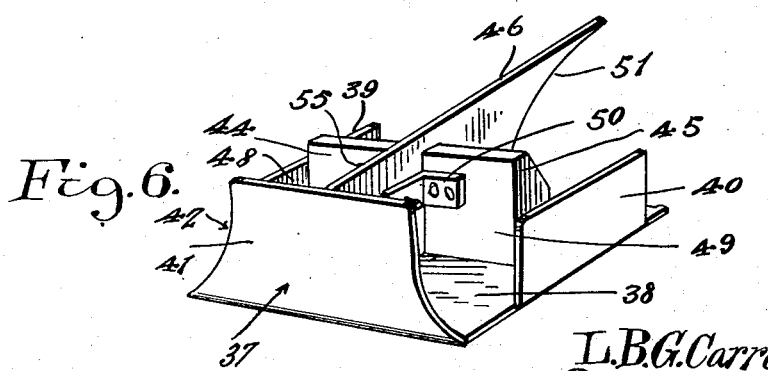
Inventor,
L.B.G.Carreras,

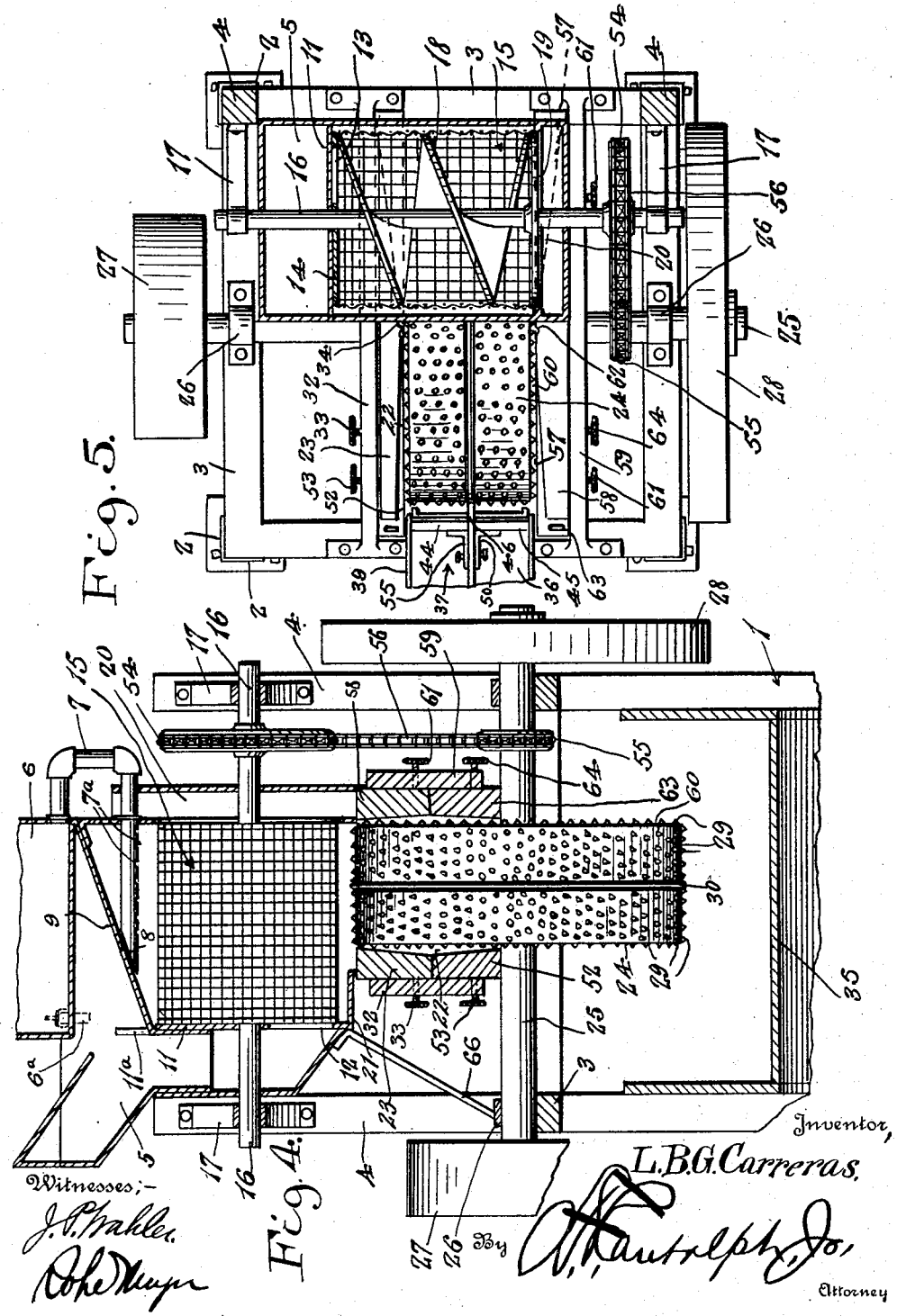

UNITED STATES PATENT OFFICE.

LUIS B. GANDIA CARRERAS, OF MOROVIS, PORTO RICO.

COFFEE PEELING AND CLASSIFYING MACHINE.

1,219,079.　　　　Specification of Letters Patent.　Patented Mar. 13, 1917.

Application filed April 14, 1916. Serial No. 91,155.

*To all whom it may concern:*

Be it known that I, LUIS B. GANDIA CARRERAS, citizen of Porto Rico, residing at Morovis, Porto Rico, have invented certain new and useful Improvements in Coffee Peeling and Classifying Machines; and I do hereby declare the following to be a full, clear, and exact description of the invention, such as will enable others skilled in the art to which it appertains to make and use the same.

This invention relates to a machine for classifying and peeling coffee berries, and the primary object of the invention is to provide a machine of this nature wherein the coffee berries are classified or sorted prior to their being peeled, of their outer skin, and to provide means for delivering the sorted and peeled coffee bean from the machine.

Another object of this invention is to provide a coffee sorting and peeling machine which includes a sorter associated with a feeding hopper, which sorter includes a rotary foraminous drum having one end partially closed, which partially closed end is provided with an opening which is adapted for registration with an opening in the side of the coffee feeding hopper for permitting of the passage of coffee berries into the rotary foraminous drum at predetermined periods during the rotation of the drum, and to provide a worm screw which is positioned interiorly of the foraminous drum and engages the large coffee berries, carrying them entirely through the drum and delivering them out of the open end of the drum to the peeling structure.

A still further object of this invention is to provide a peeling structure, which includes a rotary drum having a plurality of relatively small spurs attached to the outer surface of its sides and its periphery, for engaging the coffee berries and stripping or peeling the skin from the beans.

A still further object of this invention is to provide adjustable jaws for coaction with the rotary peeling drum which jaws are positioned upon opposite sides of the drum and adapted for movement toward or away from the sides of the drum for regulating the space between the facing sides of the jaws and the drum as required by various sized coffee berries, also to provide means for keeping the sorted berries separated during their peeling.

A still further object of this invention is to provide a separator structure to which the coffee beans are delivered from the skinning or peeling structure, which delivers the beans to bags or any other suitable container; also to provide a discharge chute for the skins of the coffee berries and to provide adjustable means for preventing the coffee beans from falling into the coffee berry skin discharging chute.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved coffee sorting and peeling machine.

Fig. 2 is a front elevation of the machine showing parts in section.

Fig. 3 is a vertical section through the machine taken on the line 3—3 of Fig. 2.

Fig. 4 is a section on the line 4—4 of Fig. 1.

Fig. 5 is a horizontal section on the line 5—5 of Fig. 1 showing parts broken away.

Fig. 6 is a detail perspective view of the separator structure.

Fig. 7 is a detail section on the line 7—7 of Fig. 2.

Referring more particularly to the drawings, 1 designates the supporting structure of the machine which includes supporting legs 2, horizontal supporting braces 3 and vertical standards 4 two of which are provided. The standards 4 form supports for a hopper 5, the upper end of which is flared as clearly shown in Fig. 2 of the drawing, and into which hopper the coffee berries are deposited. A box 6 is positioned above the hopper 5, and has a pipe 7 communicating therewith, which pipe leads downwardly and has its delivery end 8 positioned beneath an inclined partition 9. The box 6 is provided for retaining water. A pipe or stop cock structure 6ª is carried by the box 6 and is provided for permitting water to flow therefrom upon coffee retained upon the inclined partition 9. A valve 10 is mounted in the pipe 7 for controlling the flow of water therethrough. The pipe 7 is provided with a plurality of perforations 7ª to permit of the raining of water in relatively fine streams upon the drum 15 during its rotation.

The hopper 5 has a vertical partition 11 formed therein, which partition is provided with an opening 12. The partition 11 has an upstanding projection 11ª formed thereon which is provided for retaining stones or the like for preventing them from falling downwardly and passing into the rotary drum. The opening 12 is adapted for alinement with an opening 13 formed in the end 14 of the sorting or classifying drum 15. The sorting or classifying drum 15 is constructed of foraminous material, the mesh of which is of sufficient size to permit small coffee berries to pass therethrough, and to prevent large coffee berries from passing therethrough. The sorting drum 15 is mounted upon a shaft 16, which shaft is rotatably supported by suitable bearings 17 which are attached to the uprights 4. The drum 15 has a worm screw 18 positioned therein which carries the large coffee berries completely through the drum and deposits and delivers them out of the open end 19 of the sorting drum into a box 20.

The small coffee berries falling through the mesh work of the supporting drum 15 are guided by the bottom 21 of the hopper 5 into a space 22, which is formed between the facing sides of an adjustable jaw 23 and a rotary peeling or skinning drum 24. The drum 24 is mounted upon a shaft 25, which shaft is carried by suitable bearings 26. The shaft 25 has a pulley 27 mounted thereon through the medium of which power is transmitted to the shaft, and it further has a fly wheel or balancing wheel 28 mounted upon its end opposite from the pulley 27.

The peeling drum 24 has a plurality of spurs 29 formed upon its sides and periphery in spaced relation to each other. The drum 24 has an outstanding centrally disposed face 30 which is free from spurs extending outwardly from the periphery of the same which divides the drum into two sections, one of which is provided for feeding the small berries and the other the large berries, as will hereinafter more fully appear.

The adjustable jaw 23 is adjustably supported by a vertical plate or standard 32, which is supported by a pair of the horizontal bars 3 of the supporting frame 1, and it is moved toward or from one side of the rotary peeling drum 24 by the adjustment of hand screws 33. A jaw 23 has a corrugated portion 34 formed thereon, which coacts with the spurs 29 for peeling the skins from the coffee berries. The skin of the berries adheres to the spurs 29 for a limited time, and drops therefrom into a chute 35, which may deliver them into any suitable type of receiving receptacle. The coffee beans are carried about by the rotation of the peeling drum 24 and are deposited in the side 36 of a separating structure 37.

A separating structure 37 is attached in any suitable manner to the supporting frame 1 and comprises a bottom plate 38, which has upstanding sides 39 and 40 and an end plate 41. The sides and end plates 39, 40 and 41 are cut away to form delivery openings 42 and 43. A pair of relatively small jaw members 44 and 45 are carried by the base 38, and a dividing blade 46 is positioned between the facing end of these jaws and divides the separator into two compartments 48 and 49. The blade 46 is supported by suitable angle irons 50 which are attached to the vertical jaws 44 and 45. The peeled small beans of coffee are deposited by the peeling drum 24 into the compartment 48, and they pass out of this compartment through the opening 42, into any suitable type of retaining receptacle. The forward or inner edge of the blade 46 is concavely cut as shown at 51 for conforming to the curvature of the peeling drum 24.

A blade 52 is adjustably supported by the plate 32 and is provided for preventing the coffee beans from falling downwardly into the peel chute 35. The blade 52 is adjustable laterally with respect to the peeling drum 24 by means of hand screws 53.

The shaft 16 is rotated by the rotation of the main shaft 25 through the medium of a sprocket 54 which is mounted upon the shaft 16, a sprocket 55 which is mounted upon the main shaft 25 and a sprocket chain 56 which runs about the sprockets 54 and 55.

The large coffee berries are carried through the rotary sorting or classifying drum 15 by the worm 18, and are deposited into the box 20, which box delivers them into the space 57, between the adjustable jaw member 58 and the side 60 of the peeling drum 24. The jaw 58 is adjustably supported by a standard 59, and its position with respect to the side 60 of the peeling drum 24 is regulated by the adjustment of hand screws 61. A portion of the jaw 58 is corrugated as shown at 62 for coaction with the spurs of the peeling drum for peeling the coffee berries. A blade 63 is adjustably supported beneath the lower end of the jaw 58 and it is adjusted with respect to the peeling roller 24 by hand screws 64. The blade 63 forms an analogous function to that performed by the blade 52, in that it prevents the coffee bean from falling downwardly into the peeling chute 35. The large coffee beans are kept separated from the small coffee beans by the annular dividing disk 30 and they are carried about and deposited by the peeling drum 24 into the compartment 49 of the separator 37, passing out of the compartment 39 through the opening 43 into any suitable retaining receptacle.

Suitable supporting braces 66 are provided for supporting the hopper 5 carried thereby.

A housing or covering 67 is positioned over the rotary peeling drum 24 for preventing the coffee berries or skins from flying tangentially off the drum during the rotation of the latter.

Summing up, the operation of the improved coffee bean sorter and peeler is as follows. The coffee berries are deposited into the hopper 5, and when, during the rotation of the sorting drum 15, the opening 13 formed in the end 14 thereof alines with the opening 12 in the partition 11, a certain quantity of the coffee berries will pass into the rotary sorting drum 15. The small berries will, during the rotation of the sorting drum fall out through the mesh work of the drum and be deposited in the space 22 where they will be engaged by the spurs 29, during the rotation of the peeling drum 24. The coaction between the spurs 29 and the corrugations 34 of the adjustable jaw 23 will peel the pod or skin from the coffee berries, which skin will fall from the spurs upon the chute 35. The coffee berries, will be carried, by the rotation of the drum, about and deposited into the space 48 of the separator structure 37, from which they fall through the opening 42 into sacks or suitable receiving receptacles.

The large coffee berries will travel through the drum 15, being carried therethrough by the worm 18, and deposited out of the open end of the drum into the box or chute 20, which will deposit the berries in the space 57, where they will be engaged by the spurs 29 and through the coaction of the spurs with the corrugation 62 the skins or pods will be peeled from the coffee bean. The skins from the large coffee berries will also fall from the spurs upon the chute 35, while the beans will be deposited in the compartment 49 of the separator structure 37, and pass out of this compartment through the opening 43 into any suitable retaining receptacle.

From the foregoing description taken in connection with the accompanying drawings the advantages of construction and of the method of operation of the improved coffee peeling and classifying machine will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a coffee sorting and peeling machine, the combination, of coffee berry sorting means, berry peeling means divided into a portion for peeling large coffee berries and a portion for peeling small coffee berries and means for delivering the sorted berries to the respective parts of the peeling means.

2. In a coffee sorting and peeling machine, the combination, of coffee berry sorting means, berry peeling means divided into a portion for peeling large coffee berries and a portion for peeling small coffee berries, means for delivering the sorted berries to the respective parts of the peeling means, and a separator structure for delivering the sorted and peeled beans to sacks.

3. In a coffee sorting and peeling machine, the combination, of coffee berry sorting means, berry peeling means divided into a portion for peeling large coffee berries and a portion for peeling small coffee berries, means for delivering the sorted berries to the respective parts of the peeling means, a separator structure for delivering the sorted and peeled beans to sacks, and means for directing a plurality of streams of water upon said sorting means.

4. In a coffee sorting and peeling machine, the combination, of coffee berry sorting means, berry peeling means including a rotary drum, peeling spurs formed upon the ends and the periphery of the drum, vertical jaws positioned at each end of said drum and being provided with corrugated portions for co-action with the peeling spurs, and means for adjusting the positions of said jaws with respect to said drum.

5. In a coffee sorting and peeling machine, the combination, of a supporting frame, coffee berry sorting means, peeling means for receiving and peeling the sorted berries, said peeling means including a rotary peeling drum, jaws for coacting with said drum, and means for adjusting the position of said jaws with respect to said drum.

6. In a coffee sorting and peeling machine, the combination, of coffee berry sorting means, berry peeling means including a rotary drum, peeling spurs formed upon the ends and the periphery of said drum, vertical jaws positioned in each end of said drum and being provided with corrugated portions for co-action with said peeling spurs, means for adjusting the positions of said jaws with respect to said drums, said peeling means being divided into a portion for peeling large berries and a portion for peeling small berries, and means for delivering the sorted berries from the sorter to the respective portions of the peeling means.

7. In a coffee sorting and peeling machine, the combination, of coffee berry sorting means, berry peeling means including a rotary drum, peeling spurs formed upon the ends and the periphery of said drum, vertical jaws positioned in each end of said drum and being provided with corrugated portions for coaction with said peeling spurs, means for adjusting the positions of said jaws with respect to said drums, said peeling means being divided into a portion for peeling large berries and a portion for peeling small berries, means for delivering the sorted berries from the sorter to the respective portions of the peeling means, and means for delivering the sorted peeled berries to separate receptacles.

8. In a coffee sorting and peeling machine, the combination, of coffee berry sorting means, berry peeling means including a rotary drum, peeling spurs formed upon the ends and the periphery of said drum, vertical jaws positioned in each end of said drum and being provided with corrugated portions for co-action with said peeling spurs, means for adjusting the positions of said jaws with respect to said drums, said peeling means being divided into a portion for peeling large berries and a portion for peeling small berries, means for delivering the sorted berries from the sorter to the respective portions of the peeling means, means for delivering the sorted peeled berries to separate receptacles, and means for guiding a plurality of streams of water upon said sorting means.

9. In a coffee sorting and peeling machine, the combination, of a supporting frame, coffee berry sorting means carried by said frame, a peeling drum rotatably supported by said frame, a plurality of peeling spurs formed upon the ends and periphery of said drum, a housing extending over the upper portion of the drum, a partition carried by said housing and dividing the space around the upper portion of said drum into a large coffee berry receiving portion and a small coffee berry receiving portion, and means for delivering the sorted berries from said sorting means to the respective portions of the space about the drum whereby the large berries will be peeled separated from the small berries.

10. In a coffee sorting and peeling machine, the combination of a supporting frame, coffee berry sorting means carried by said frame, a peeling drum rotatably supported by said frame, a plurality of peeling spurs mounted upon the ends and periphery of said drum, a housing extending over the upper portion of said drum, a partition carried by the housing and dividing the space around the upper portion of said drum into a large coffee berry receiving portion and a small coffee berry receiving portion, means for delivering the sorted berries from said sorting means to the respective portions of the space about said drum whereby the large berries will be peeled separated from the small berries, vertical jaws positioned at each end of said drum and being provided with corrugated portions for co-action with said peeling spurs, and means for adjusting the positions of said jaws with respect to said drum.

11. In a coffee sorting and peeling machine, the combination of a supporting frame, coffee berry sorting means carried by said frame, a peeling drum rotatably supported by said frame, a plurality of peeling spurs mounted upon the ends and periphery of said drum, a housing extending over the upper portion of said drum, a partition carried by the housing and dividing the space around the upper portion of said drum into a large coffee berry receiving portion and a small coffee berry receiving portion, means for delivering the sorted berries from said sorting means to the respective portions of the space about said drum whereby the large berries will be peeled separated from the small berries, vertical jaws positioned at each end of said drum and being provided with corrugated portions for co-action with said peeling spurs, means for adjusting the positions of said jaws with respect to said drum, and a separator structure for delivering the sorted and peeled beans to separate receptacles.

12. In a coffee sorting and peeling machine, the combination, of a supporting frame, coffee berry sorting means carried by said frame, a peeling drum rotatably supported by said frame, a plurality of peeling spurs formed upon the ends and periphery of said drum, a housing extending over the upper portion of said drum, a partition carried by said housing and dividing the space around the upper portion of the drum into a large coffee berry receiving portion and a small coffee berry receiving portion, means for delivering the sorted berries from said sorting means to the respective portions of the space about said drum, whereby the large berries will be peeled separated from the small berries, vertical jaws positioned at each end of said drum and being provided with corrugated portions, for co-action with said peeling spurs, means for adjusting the position of said jaws with respect to said drum, a skin receiving chute, and means for preventing the peeled berries from entering said receiving chute.

In testimony whereof I affix my signature in presence of two witnesses.

LUIS B. GANDIA CARRERAS.

Witnesses:
 RAMON ABARCA,
 JOSÉ M. SAJO.